United States Patent
Inomoto et al.

(10) Patent No.: US 8,968,860 B2
(45) Date of Patent: Mar. 3, 2015

(54) APPARATUS AND PROCESS FOR PRODUCING LAMINATED SHEET

(75) Inventors: Takeshi Inomoto, Otsu (JP); Fumiyasu Nomura, Otsu (JP); Yoshiharu Furuno, Otsu (JP)

(73) Assignee: Toray Industries, Inc., Tokyo (JP)

( * ) Notice: Subject to any disclaimer, the term of this patent is extended or adjusted under 35 U.S.C. 154(b) by 725 days.

(21) Appl. No.: 12/672,216

(22) PCT Filed: Aug. 6, 2008

(86) PCT No.: PCT/JP2008/064081
§ 371 (c)(1),
(2), (4) Date: Feb. 4, 2010

(87) PCT Pub. No.: WO2009/020135
PCT Pub. Date: Feb. 12, 2009

(65) Prior Publication Data
US 2011/0223403 A1  Sep. 15, 2011

(30) Foreign Application Priority Data
Aug. 7, 2007 (JP) .................. 2007-205033

(51) Int. Cl.
*B32B 7/02* (2006.01)
*B29C 47/14* (2006.01)
*B29C 47/70* (2006.01)
(Continued)

(52) U.S. Cl.
CPC ............ *B29C 47/145* (2013.01); *B29C 47/707* (2013.01); *B29C 47/0021* (2013.01); *B29C 47/065* (2013.01); *B29K 2105/256* (2013.01); *B29L 2009/00* (2013.01); *B29C 47/56* (2013.01); *B29C 47/0057* (2013.01); *B29C 47/061* (2013.01); *B29C 47/062* (2013.01); *B29C 47/8845* (2013.01)
USPC ........ 428/212; 428/220; 428/192; 425/133.5; 425/462; 425/463

(58) Field of Classification Search
USPC ............ 428/220, 212, 411.1, 192; 425/133.5, 425/462, 463
See application file for complete search history.

(56) References Cited

FOREIGN PATENT DOCUMENTS

| JP | 6-91719 A | 4/1994 |
|---|---|---|
| JP | 2006-123541 A | 5/2006 |

(Continued)

OTHER PUBLICATIONS

Inomoto et al (JP 2007-268847 machine translation), Oct. 2007.*
(Continued)

*Primary Examiner* — Aaron Austin
*Assistant Examiner* — Lawrence Ferguson
(74) *Attorney, Agent, or Firm* — RatnerPrestia

(57) ABSTRACT

There is provided a laminated sheet producing apparatus that adds an edge material to at least one of the end portions in the width direction of a laminate in which a plurality of kinds of sheet materials are laminated as an edge portion at a confluence portion, wherein when an area of each region resulting from division of a cross-sectional configuration of the edge material perpendicular to the flow channel direction of each flow channel at the confluence portion by lines for dividing the configuration into 10 equal portions in the lamination direction is defined as Sn (n=1, 2, 3, 4, 5) in the direction from a central portion in the lamination direction toward an end portion in the lamination direction, the relationships of Formulae (1) $S1 \leq S2 \leq S3 \leq S4 \leq S5$ and (2) $S1 < S5$ are simultaneously satisfied.

4 Claims, 20 Drawing Sheets

(51) Int. Cl.
*B29C 47/00* (2006.01)
*B29C 47/06* (2006.01)
*B29K 105/00* (2006.01)
*B29L 9/00* (2006.01)
*B29C 47/56* (2006.01)
*B29C 47/88* (2006.01)

(56) References Cited

FOREIGN PATENT DOCUMENTS

| JP | 2006-159537 A | 6/2006 |
| JP | 2006-212941 A | 8/2006 |
| JP | 2007-268847 A | 10/2007 |

OTHER PUBLICATIONS

Nakanishi (JP 2006159537 machine translation), Jun. 22, 2006.*

Tanigaki et al (JP 06-091719 machine translation), Apr. 5, 1994.*

International Search Report dated Oct. 7, 2008, application No. PCT/JP2008/064081.

* cited by examiner

US 8,968,860 B2

APPARATUS AND PROCESS FOR PRODUCING LAMINATED SHEET

This application is a U.S. National Phase Application of PCT International Application No. PCT/JP2008/064081, filed Aug. 6, 2008, which claims priority to Japanese Patent Application No. 2007-205033, filed Aug. 7, 2007, the contents of each of these applications being incorporated by reference herein in their entirety.

FIELD OF THE INVENTION

The present invention relates to an apparatus and a process for producing a laminated sheet.

BACKGROUND OF THE INVENTION

Nowadays, the application of a multilayer film having a multi-layered structure in which a plurality of kinds of sheet materials are laminated in the thickness direction of the sheet has been spreading to the optical application. As for the multilayer film to be used for the optical application, optical characteristics of the multilayer film are determined by the layer thickness distribution of each sheet material. Therefore, a very high lamination precision is required. Here, the multilayer film is obtained from a laminated sheet formed by laminating a plurality of kinds of sheet materials, and thus the lamination precision of the multilayer film is largely dependent on the lamination precision of the laminated sheet.

A known example of the apparatus and the process for producing a laminated sheet includes the method of producing a laminated sheet including the steps of supplying a plurality of kinds (particularly two kinds) of sheet materials (typically a melting resin, etc.) to each manifold, diverting the sheet material supplied to each manifold through multiple slits to form a laminate with multiple layers, and discharging the laminate from a die having a slit gap extending in the width direction of the laminated sheet (hereinafter referred to as width direction). Then, the laminated sheet discharged from the die is solidified and left or subjected to post-treatment such as drawing to be formed into a multilayer film (hereinafter, product obtained by solidifying laminated sheet is referred to as multilayer film).

Subsequently, a typical example of the laminated sheet producing apparatus is described. FIG. 1 is a perspective view for explaining a typical laminated sheet production apparatus and a production process. As shown in FIG. 1, the laminated sheet producing apparatus includes sheet material introducing pipes 1 and 2 which supply sheet materials A and B, a multilayer laminating apparatus 3 which forms a laminate in which a large number of the sheet materials A and B supplied by the sheet material introducing pipes 1 and 2 are alternately laminated, a conduit 4 which guides the laminate to the downstream, a die which adjusts the width and thickness of the laminate from the conduit 4 to a predetermined value, discharges the adjusted laminate, and forms a laminated sheet, and a casting drum 7 which cools and solidifies a laminated sheet 6 discharged from the die 5. The laminated sheet solidified by the casting drum 7 is usually sent to a drawing process (not shown) as indicated by an arrow NS and drawn in one or two directions to form a multilayer film.

Here, a typical example of the multilayer laminating apparatus 3 is described. FIG. 2 is a partial perspective view showing only an internal space allowing sheet materials or the like for a typical multilayer laminating apparatus to pass through. As shown in FIG. 2, the multilayer laminating apparatus 3 includes sheet material introducing channels 21 and 22 which supply the sheet materials A and B, manifolds 23 and 24 which uniformly distribute the sheet materials A and B supplied from the sheet material introducing channels 21 and 22 to the lamination direction of the laminated sheet (hereinafter referred to as lamination direction), lines of a large number of pores 25 and 26 which separate the sheet materials A and B from the manifolds 23 and 24 into a predetermined layer number, lines of a large number of slits 27 and 28 which guide the sheet materials A and B from each of the pores 25 and 26 to the downstream, and a lamination completing unit 29 which forms a laminate in which a large number of the sheet material A and B from each of the slits 27 and 28 are alternately laminated.

However, according to a finding of the present inventors, when a laminated sheet for optical application is formed in which a large number of two kinds of sheet materials (sheet materials A and B) are alternately laminated using the conventional laminated sheet producing apparatus, it has been found that a multilayer film in which the thickness of each layer is not uniform in the width direction is obtained from the formed laminated sheet by rapid flow change due to widening in the width direction of the die 5. FIG. 9 is a cross-sectional view of a multilayer film produced using the conventional laminated sheet producing apparatus. As shown in FIG. 9, a multilayer film 40 includes a layer 41 of the sheet material A and a layer 42 of the sheet material B. When the cross section of the multilayer film 40 is observed, it is found that the thickness of the layer closer to the surface layer tends to be thinner in the layers 41 and 42 at a central portion in the width direction and the thickness of the layer closer to the surface layer tends to be thicker at an end portion in the width direction. That is, the thickness of each layer is not uniform in the width direction and the lamination precision is low. Therefore, in the case of the conventional laminated sheet producing apparatus, it has sometimes been difficult to form a lamination sheet which sufficiently satisfies the lamination precision required for a multilayer film to be used for optical application.

Under such circumstances, the present applicants disclose a technique of the multilayer laminating apparatus 3 in which the thickness of each layer becomes uniform in the width direction in Patent document 1. FIG. 3 is a partial perspective view showing only an internal space allowing sheet materials or the like for a multilayer laminating apparatus which is used in the laminated sheet producing apparatus proposed by the applicants of Patent document 1 to pass through. The basic structure of the multilayer laminating apparatus 3 shown in FIG. 3 is almost the same as that of the multilayer laminating apparatus 3 shown in FIG. 2. However, they are different from each other in that there is nothing corresponding to the pores 25 and 26 of FIG. 2 and the upper portions of the slits 27 and 28 are obliquely formed. The unevenness of the flow rate in the width direction of the sheet material is resolved by obliquely forming the upper portions of the slits in the multilayer laminating apparatus 3 shown in FIG. 3 and the thickness of each layer may become uniform in the width direction. However, the lamination precision is further required in the optical application, which requires the lamination precision strictly.

According to a finding of the present inventors, the following reason is considered as a cause of the phenomenon as shown in FIG. 9. When a fluid flows through a channel, the flow rate distribution of the fluid varies depending on a cross-sectional configuration perpendicular to the flow channel direction. That is, when the cross-sectional configuration perpendicular to the flow channel direction is changed to the flow channel direction, the flow of a fluid is generated in a direction perpendicular to the flow channel direction of the flow channel (namely, width direction or lamination direction). When the typical laminated sheet producing apparatus of FIG. 1 is taken for example, the die is rapidly widened in the width direction and then reduced in the lamination direction. Thus, the cross-sectional configuration of the flow channel is rapidly changed by the die and the portion near the surface layer of the laminate flows toward both end portions in the width direction. The surface layer at the central portion in width direction is thinned by the flow of the laminate thus generated and the thickness of each layer becomes non-uniform in the width direction. Therefore, it is considered that the lamination precision becomes low.

Incidentally, an example of a technique which looks similar to the preferred embodiments of the present invention at the first glance includes a laminated sheet producing apparatus disclosed in Patent document 2.

A method for reducing the cost by using an inexpensive resin for both end portions of a laminated sheet in the width direction is disclosed in Patent document 2. FIG. 18 is a cross-sectional view perpendicular to the width direction of the multi-manifold die of Patent document 2. FIG. 19 is a cross section of a line H-H of FIG. 18, namely, a cross-sectional view perpendicular to the lamination direction of the multi-manifold die of Patent document 2. As shown in FIGS. 18 and 19, a multi-manifold die 70 includes resin flow channels 71 to 73 which supply resins A, B, and C, manifolds 74 to 76 which uniformly distribute the resins A, B, and C supplied from the resin flow channels 71 to 73 in the width direction, slits 77 to 79 which guide the resins A, B, and C from the manifolds 74 to 76 to the downstream, a lamination completing unit 80 which laminates the resins A, B, and C from the slits 77 to 79 to form a laminate, a resin flow channel 81 which diverts the resin A flowing through the resin flow channel 71, a confluence portion 82 which adds the resin A from the resin flow channel 81 to both end portions in the width direction of the laminate as an edge portion, and a slit 83 which discharges the laminate formed by the confluence portion 82 to form a laminated sheet. The formation of the laminated sheet using the multi-manifold die 70 allows only the edge portion formed solely by the resin A which is inexpensive to be cut in the following step. The amount of the expensive resins B and C used and the cost may be reduced.

However, according to a finding of the present inventors, the conventional laminated sheet producing apparatus described in Patent document 2 is a technique aiming at cost reduction at the time of production. Since a technical idea in which the thickness of each layer is uniform to the width direction is not disclosed, it does not reach the level which survives the optical application at a point of the lamination precision. This is because such a technique is aimed at controlling a layer whose layer number is several, namely, the layer with a thickness of several tens μm per layer. Therefore, there is no problem to control a layer whose layer number is several hundred, namely, the layer with a thickness of several tens nm per layer like a film for optical application.

Patent document 1: Japanese Patent Application Laid-Open (JP-A) No. 2006-123541
Patent document 2: JP-A No. 6-91719

SUMMARY OF THE INVENTION

The present invention provides an apparatus and a process for producing a laminated sheet in which a laminated sheet of layers with uniform thickness in the width direction thereof and laminated with high precision can be easily produced by forming an edge portion with an appropriate cross-sectional configuration at the end portion in the width direction of a laminate without the need for a complex control apparatus.

According to aspects of the present invention, there is provided a laminated sheet producing apparatus which includes a multilayer laminating apparatus that forms a first laminate in which a plurality of kinds of sheet materials are laminated in the lamination direction as layers having a layer number more than the number of the plurality of kinds of sheet materials, an edge adding apparatus having a confluence portion which forms a second laminate in which an edge material is added to at least one of end portions in the width direction of the first laminate flowing along the flow channel direction as an edge portion, and a die that molds the second laminate into a sheet shape, wherein when an area of each region resulting from division of a cross-sectional configuration of the edge material perpendicular to the flow channel direction of each flow channel at the confluence portion by lines for dividing the configuration into 10 equal portions in the lamination direction is defined as $S_n$ ($n=1, 2, 3, 4, 5$) in the direction from a central portion in the lamination direction toward an end portion in the lamination direction, the relationships of Formulae (1) and (2) are simultaneously satisfied.

$$S_1 \leq S_2 \leq S_3 \leq S_4 \leq S_5 \tag{1}$$

$$S_1 < S_5 \tag{2}$$

According to a preferred embodiment of the present invention, there is provided the laminated sheet producing apparatus in which the relation of Formula (3) is satisfied in the cross-sectional configuration.

$$S_n/S_1 \leq 1.0 + 0.25(n-1) \tag{3}$$

According to a preferred embodiment of the present invention, there is provided the laminated sheet producing apparatus in which when a size in the width direction of an inflow portion is defined as $W_1$ and a size in the width direction of an outflow portion is defined as $W_2$ in the flow channel in the die, the range is $5 < W_2/W_1 < 50$.

According to a preferred embodiment of the present invention, there is provided a method of producing a laminated sheet which includes the steps of forming a first laminate in which a plurality of kinds of sheet materials are laminated in the lamination direction as layers having a layer number more than the number of the plurality of kinds of sheet materials, forming a second laminate in which an edge material is added to at least one of end portions in the width direction of the first laminate flowing along the flow channel direction as an edge portion at a confluence portion, and molding the second laminate into a sheet shape with a die, wherein a cross-sectional configuration perpendicular to the flow channel direction of each flow channel of the edge material at the confluence portion simultaneously satisfies the relationships of Formulae (1) and (2) when an area of each region resulting from division of the cross-sectional configuration by lines for dividing the configuration into 10 equal portions in the lamination direction is defined $S_n$ ($n=1, 2, 3, 4, 5$) in the direction from a central portion in the lamination direction toward an end portion in the lamination direction.

$$S_1 \leq S_2 \leq S_3 \leq S_4 \leq S_5 \tag{1}$$

$$S_1 < S_5 \tag{2}$$

According to a preferred embodiment of the present invention, there is provided the method of producing a laminated sheet in which the first laminate has a layer number in the range of 50 to 3000.

According to a preferred embodiment of the present invention, there is provided the method of producing a laminated sheet in which the viscosity of the edge material is equal to or smaller than that of any of the sheet materials.

According to a preferred embodiment of the present invention, there is provided a multilayer film, wherein the multilayer film has a film thickness in the range of 1 to 600 μm, a layer number in the range of 50 to 3000, and a lamination precision of 0.002 or less.

According to a preferred embodiment of the present invention, there is provided a multilayer film, wherein the multilayer film has a film thickness in the range of 1 to 600 μm, a layer number in the range of 50 to 3000, and a lamination unevenness of 0.20 or less.

In the present invention, the term "sheet material" means a material constituting the first laminate. Usable examples of the sheet material include polyolefin resins such as polyethylene, polypropylene, polystyrene, and polymethylpentene; alicyclic polyolefin resins, polyamide resins such as Nylon 6 and Nylon 66; aramid resins, polyester resins such as polyethylene terephthalate, polybutylene terephthalate, polypropylene terephthalate, polybutyl succinate, and polyethylene-2,6-naphthalate; polycarbonate resins, polyarylate resins, polyacetal resins, polyphenylene sulfide resins, fluorine resins such as tetrafluoroethylene resins, trifluoroethylene resins, chlorotrifluoroethylene resins, tetrafluoroethylene-hexafluoropropylene copolymers, and polyvinylidene fluoride resins; acrylic resins, methacrylic resins, polyacetal resins, polyglycolic acid resins, polylactic resins, and a fluidized product obtained by dissolving these resins in a solvent or melting them. These thermoplastic resins may be homo-resins. They may be copolymerized or two or more of them may be blended. Further, various additive agents such as antioxidants, antistatic agents, crystalline nucleus agents, inorganic particles, organic particles, adhesiveness-reducing agents, thermal stabilizers, lubricants, infrared absorption agents, ultraviolet absorbers, or dopants for refractive-index adjustment may be added to each thermoplastic resin. As the sheet material constituting the first laminate, it is preferable to select 2 to 10 materials from the above-described materials for use.

In the present invention, the term "laminate" means a sheet material in which the plurality of kinds of sheet materials are laminated in the lamination direction as a large number of layers during the period from extrusion from an extruder until discharge from the die.

In the present invention, the term "first laminate" means a laminate formed with the multilayer laminating apparatus. The first laminate preferably has a layer number in the range of 50 to 3000.

In the present invention, the term "edge material" means a material which is added to at least one of the end portions in the width direction of the first laminate as the edge portion. As the edge material, materials which may be used as the above-described sheet materials may be used. The edge material may be the same material as any of the plurality of kinds of sheet materials constituting the first laminate.

In the present invention, the term "edge portion" means a portion formed with the edge material in the second laminate.

In the present invention, the term "second laminate" means a laminate formed by adding the edge material to at least one of the end portions in the width direction of the first laminate as the edge portion with the edge adding apparatus.

In the present invention, the term "laminated sheet" means a laminate whose width and thickness are adjusted and which is discharged from the die.

In the present invention, the term "flow channel direction" means a main flow direction of the first or second laminate in the flow channel.

In the present invention, the term "lamination direction" means a direction which corresponds to the thickness direction of a laminated sheet when the first or second laminate in the flow channel is molded into the laminated sheet.

In the present invention, the term "width direction" means a direction which corresponds to the width direction of a laminated sheet and is perpendicular to the flow channel direction and the lamination direction when the first or second laminate in the flow channel is molded into the laminated sheet.

In the present invention, the flow channel direction, the lamination direction, and the width direction are changed depending on the configuration of the flow channel flowing the first or second laminate.

In the present invention, the "confluence portion" means a part including a meeting point (hereinafter referred to as a confluence) in which the flow channel through which the first laminate passes and each flow channel through which the edge material passes meet in the edge adding apparatus. In this regard, the term "cross-sectional configuration perpendicular to the flow channel direction of each flow channel of the edge material at the confluence portion" means a configuration of the cross section perpendicular to the flow channel direction in a portion where the confluence is set to the upstream at 1/50 in size in the lamination direction in the confluence.

In embodiments of the present invention, the multilayer laminating apparatus and the edge adding apparatus may be formed as one laminating apparatus.

In the present invention, the term "W1 in the width direction of an inflow portion in the flow channel in the die" means an inflow portion, namely, the size in the width direction before widening in the width direction. Further, the term "W2 in the width direction of an outflow portion in the flow channel in the die" means an outflow portion, namely, the size in the width direction after widening in the width direction. Further, "W2/W1" means a widening ratio in which the flow channel in the die is widen in the width direction.

In embodiments of the present invention, the viscosity of the edge material is equal to or smaller than that of any of the sheet materials. As a result, the effect of the edge material that relieves the friction due to the wall surface of the die becomes significant.

In the present invention, the viscosity of a coating liquid is measured using a rheometer (RC20, manufactured by Leotec) in accordance with JIS Z8803. In that case, the temperature and the shear rate which are equal to those in an actual die are used as a temperature and a shear rate, i.e., measurement conditions.

In the present invention, the term "film thickness" means an average value of the thickness of the film obtained by measuring at 10 points for dividing the film into almost equal portions in the width direction of the multilayer film.

In the present invention, the term "lamination precision" means a value obtained by plotting standard deviations of the thickness of each layer at 10 points for dividing the film into almost equal portions in the width direction of the multilayer film and dividing the average value of the standard deviations of each layer by the film thickness.

In the present invention, the term "lamination unevenness" means an average value of the values of each layer which are calculated by subtracting the minimum value from the maximum value of the thickness of each layer at 10 points for dividing the film into almost equal portions in the width direction of the multilayer film and dividing by the minimum value.

In the present invention, the thickness of each layer used at the time of calculating the "lamination precision" and the "lamination unevenness" was measured by observing the cross section of the film at a magnification of 3000 to 40000 times using a transmission electron microscope (HU-12 type, manufactured by Hitachi, Ltd. and taking a cross-sectional photograph. Here, the multilayer film to be used for measurement preferably has a width of 400 mm or more. Depending on the combination of the resin to be used, the film may be measured by increasing the contrast using a suitable staining technique.

In the apparatus and the process for producing a laminated sheet according to embodiments of the present invention, a laminated sheet in which a laminated sheet of layers with uniform thickness in the width direction thereof and laminated with high precision can be easily produced by forming an edge portion with an appropriate cross-sectional configuration at the end portion in the width direction of a laminate without the need for a complex control apparatus.

BRIEF DESCRIPTION OF THE DRAWINGS

FIG. 2 is a partial perspective view showing only an internal space allowing sheet materials or the like for a typical multilayer laminating apparatus to pass through.

FIG. 3 is a partial perspective view showing only an internal space allowing sheet materials or the like for the multilayer laminating apparatus which is used in the laminated sheet producing apparatus of Patent document 1 to pass through.

FIG. 5 is a partial perspective view showing only an internal space allowing sheet materials or the like for the edge adding apparatus which is used in the laminated sheet producing apparatus in an embodiment to pass through.

DESCRIPTION OF THE SYMBOLS

Figure 1:
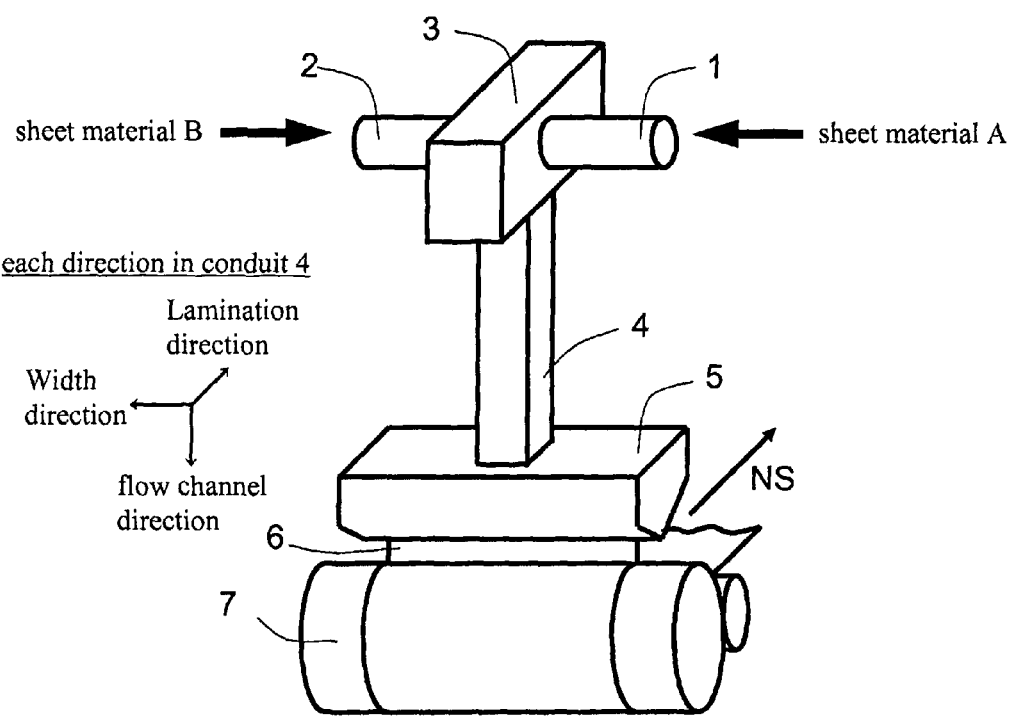
FIG. 1 is a perspective view for explaining a typical laminated sheet production apparatus and a production process.

1: Sheet material introducing pipe to which sheet material A is supplied
2: Sheet material introducing pipe to which sheet material B is supplied
3: Multilayer laminating apparatus
4: Conduit
5: Die
6: Laminated sheet
7: Casting drum
10: Edge material introducing pipe to which edge material is supplied
11: Edge portion adding apparatus
21, 22: Sheet material introducing channels
23, 24: Manifolds
25, 26: Pores
27, 28: Slits
29: Lamination completing unit
31: Flow channel of first laminate
32: Edge material introducing channel
34, 35: Flow channels of edge material
36: Confluence portion
40: Multilayer film without edge portion
41: Layers of sheet material A
42: Layers of sheet material B
50, 60: Multilayer films with edge portion
51, 61: Layers of sheet material A
52, 62: Layers of sheet material B
53, 63: Edge portions
70: Multi-manifolds
71 to 73, 81: Resin flow channels
74 to 76: Manifolds
77 to 79, 83: Slits
80: Lamination completing unit
82: Confluence portion

DETAILED DESCRIPTION OF THE INVENTION

Hereinafter, certain embodiments will be described in detail. However, the present invention is not limited to the embodiments including the Examples as described hereinbelow.

FIGS. 4 to 8, FIGS. 12 to 14, and FIG. 20 are views related to the laminated sheet producing apparatus in embodiments of the present invention. In this regard, members with the same application and function as those of prior art may have the same symbols in each drawing.

In one embodiment, a laminated sheet is formed by the steps of supplying a plurality of kinds (particularly two kinds) of sheet materials to each manifold, diverting the sheet material supplied to each manifold through a plurality of slits to form a first laminate with a plurality of layers, supplying an edge material to the manifolds to form a second laminate in which the edge material supplied to the manifolds is added to at least one of the end portions in the width direction of the first laminate as an edge portion, and discharging the second laminate from a die having a slit gap extending in the width direction.

Figure 4:
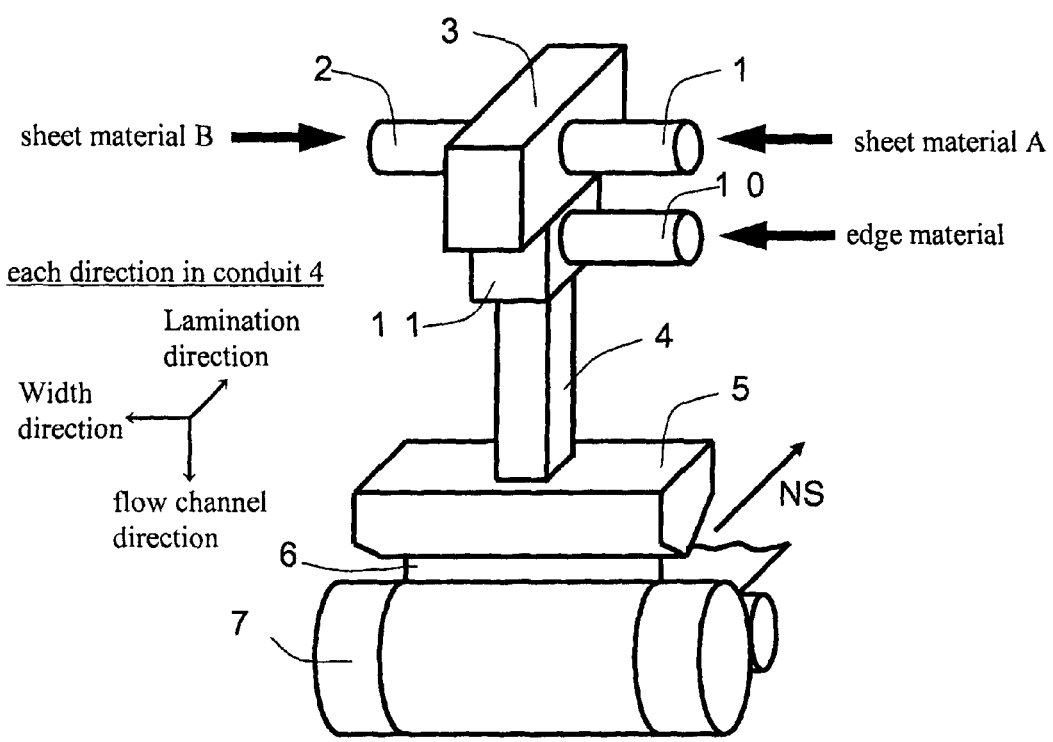
FIG. 4 is a perspective view for explaining the laminated sheet producing apparatus and the production process in an embodiment.

Subsequently, a basic structure of the laminated sheet producing apparatus in the embodiment will be described. FIG. 4 is a schematic perspective view of the laminated sheet producing apparatus in the embodiment. The basic structure of the laminated sheet producing apparatus in the embodiment is almost the same as that of the laminated sheet producing apparatus shown in FIG. 1 and has features of addition of a sheet material introducing pipe 10 and an edge adding apparatus 11 and its internal structure. That is, as shown in FIG. 4, the laminated sheet producing apparatus in the embodiment includes sheet material introducing pipes 1 and 2 which supply sheet materials A and B, a multilayer laminating apparatus 3 which forms a first laminate in which a large number of the sheet materials A and B supplied by the sheet material introducing pipes 1 and 2 are alternately laminated, an edge material introducing pipe 10 which supplies an edge material, an edge adding apparatus 11 which forms a second laminate by adding the edge material supplied from the edge material introducing pipe 10 to the end portion in the width direction of the first laminate as an edge portion, a conduit 4 which guides the second laminate to the downstream, a die 5 which adjusts the width and thickness of the second laminate from the conduit 4 to a predetermined value, discharges the adjusted second laminate, and forms a laminated sheet, and a casting drum 7 which cools and solidifies a laminated sheet 6 discharged from the die 5. The laminated sheet solidified by the casting drum 7 is usually sent to a drawing process (not shown) as indicated by an arrow NS and drawn in one or two directions to form a multilayer film.

Figure 2:
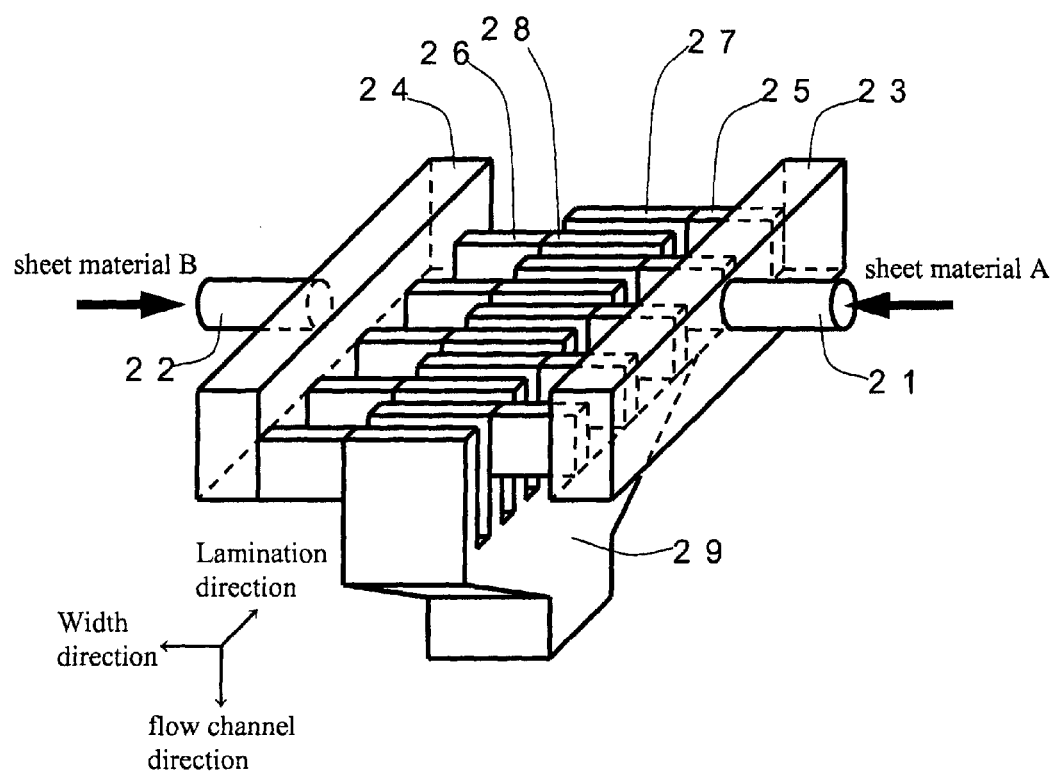

Here, as the multilayer laminating apparatus 3 to be used in the laminated sheet producing apparatus in the embodiment, one having the structure shown in FIG. 2 of the conventional technique may be used. In order to make the thickness of each layer uniform in the width direction, it is also preferable to use one having the structure shown in FIG. 3.

Figure 5:
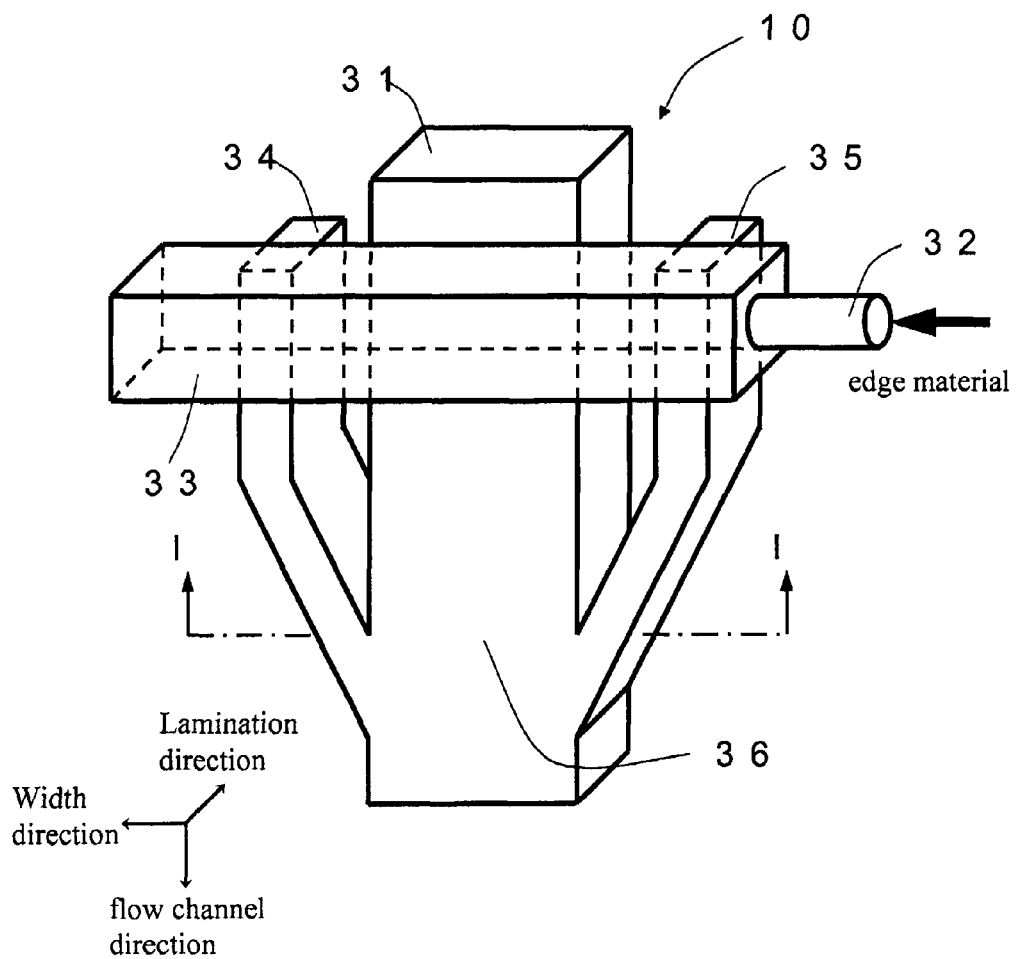

Here, a basic structure of the edge adding apparatus 11 which is used in the laminated sheet producing apparatus in the embodiment will be described. FIG. 5 is a partial perspective view showing only an internal space allowing sheet materials or the like for the edge adding apparatus which is used in the laminated sheet producing apparatus in the embodiment to pass through. As shown in FIG. 5, the edge adding apparatus 11 includes a flow channel 31 which guides a first laminate formed with the multilayer laminating apparatus 3 to the downstream, an edge material introducing channel 32 which supplies an edge material, a manifold 33 which uniformly distributes the edge material supplied from the edge material introducing channel 32 in the width direction, flow channels 34 and 35 which guide the edge material from the manifold 33 to the flow channel 31, and a confluence portion 36 which forms a second laminate by adding the edge material from the flow channels 34 and 35 to the end portion in the width direction of the first laminate as an edge portion.

As a result of further intensive examination, the present inventors have found out that a laminated sheet of layers with uniform thickness in the width direction thereof and laminated with high precision can be obtained by satisfying the relationships of Formulae (1) and (2) when an area of each region resulting from division of a cross-sectional configuration of the edge material perpendicular to the flow channel direction of the flow channels 34 and 35 at the confluence portion 36 by lines for dividing the configuration into 10 equal portions in the lamination direction is defined as Sn (n=1, 2, 3, 4, 5) in the direction from the central portion in the lamination direction toward both end portions in the lamination direction.

$$S1 \leq S2 \leq S3 \leq S4 \leq S5 \tag{1}$$

$$S1 < S5 \tag{2}$$

Figure 6:
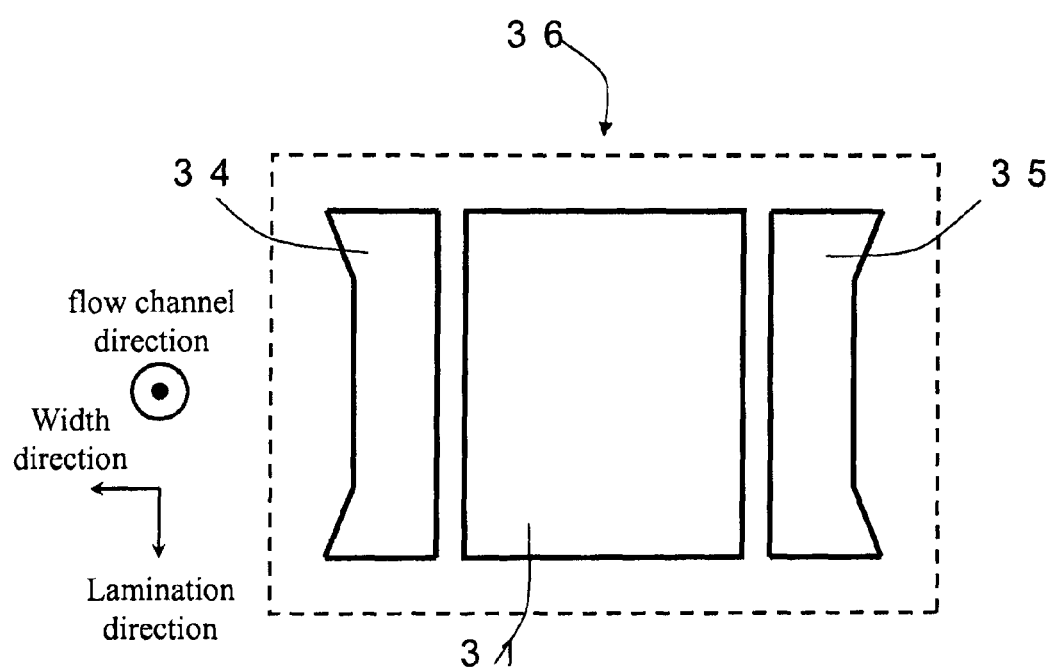
FIG. 6 is a cross-sectional view perpendicular to the flow channel direction of the confluence portion of the edge adding apparatus which is used in the laminated sheet producing apparatus in an embodiment.
Figure 7:
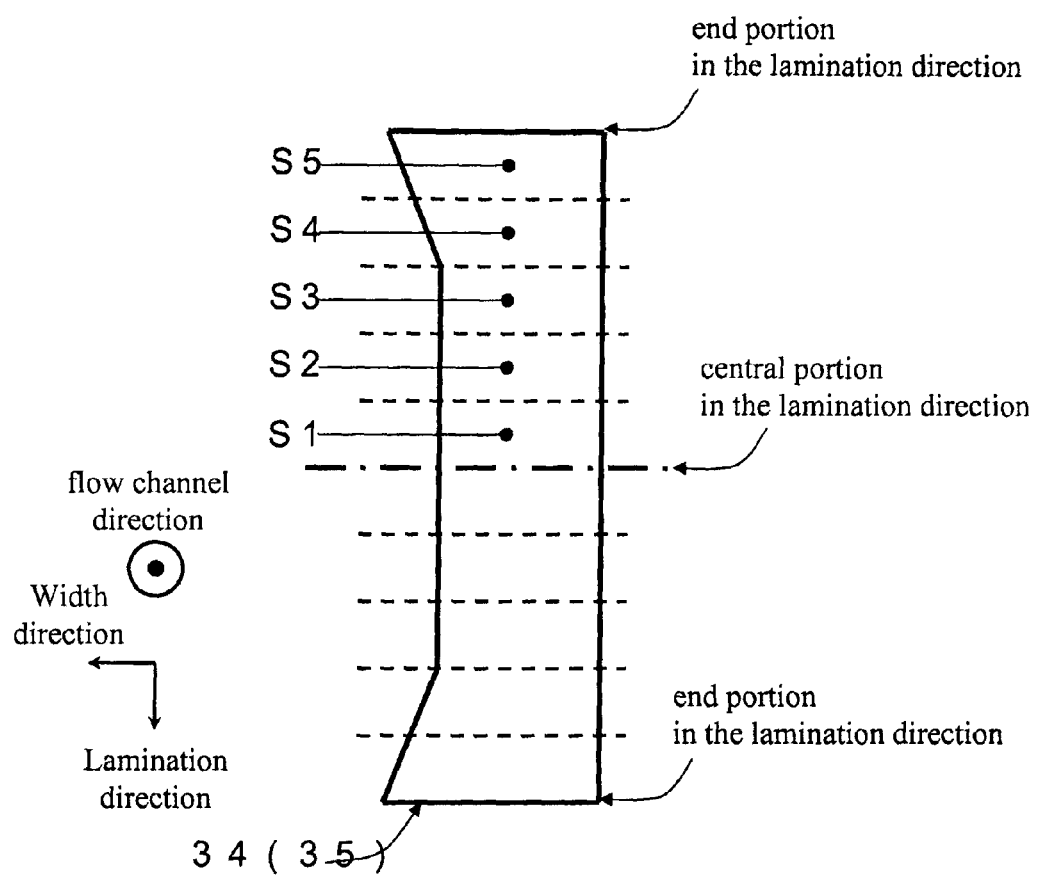
FIG. 7 is a schematic view of a cross-sectional configuration perpendicular to the flow channel direction of each flow channel of the edge material which is used in the laminated sheet producing apparatus in an embodiment.

Here, an example of the structures will be described hereinafter. FIG. 6 is a cross section of a line I-I of FIG. 5, namely, a cross-sectional view perpendicular to the flow channel direction of the confluence portion of the edge adding apparatus which is used in the laminated sheet producing apparatus in the embodiment. FIG. 7 is a schematic view of the cross-sectional configuration of FIG. 6, namely, the cross-sectional configuration perpendicular to the flow channel direction of each flow channel of the edge material which is used in the laminated sheet producing apparatus in the embodiment. As shown in FIG. 7, dashed lines equally divide the cross-sectional configuration into 10 portions in the lamination direction. An area of each region divided by the dashed lines is defined as Sn (n=1, 2, 3, 4, 5) in the direction from the central portion in the lamination direction toward the end portion in the lamination direction. The areas of FIGS. 6 and 7 satisfy the relation between Formulae (1) and (2), which is an example of the structure.

Here, the structures as shown in FIGS. 6 and 7, namely, a technical sense in which the relation between Formulae (1) and (2) is satisfied will be described hereinafter. First, with reference to when the relation between Formulae (1) and (2) is not satisfied, namely, when the cross-sectional configuration of each flow channel of the edge material is rectangular, a multilayer film produced using an apparatus for producing a laminated sheet having such a cross-sectional configuration will be described.

Figure 10:
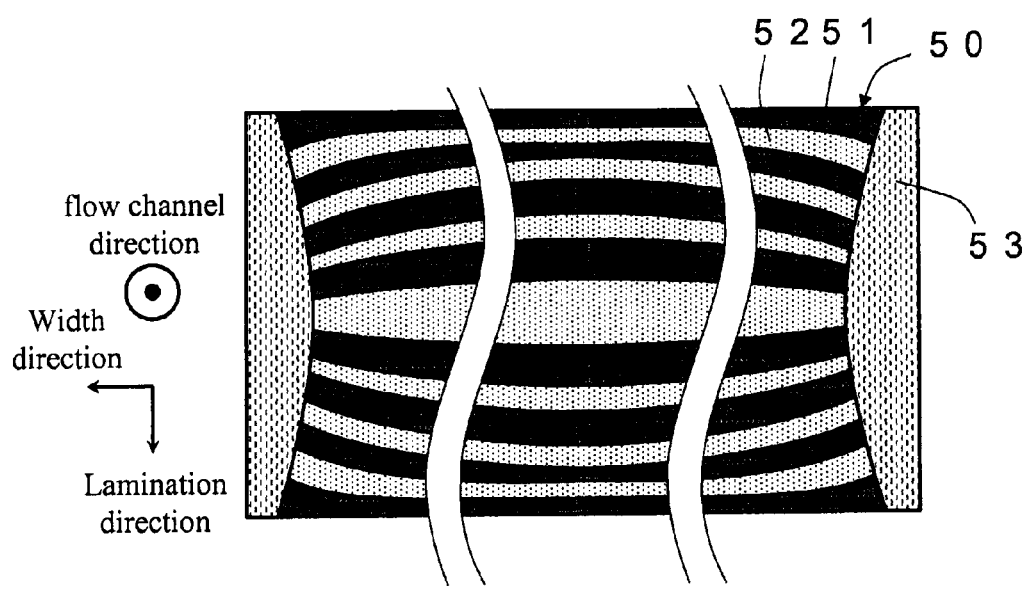
FIG. 10 is a cross-sectional view of a multilayer film produced using a laminated sheet producing apparatus in which the cross-sectional configuration of each flow channel of the edge material is rectangular.

FIG. 10 is a cross-sectional view of a multilayer film produced using a laminated sheet producing apparatus in which the cross-sectional configuration of each flow channel of the edge material is rectangular. As shown in FIG. 10, a multilayer film 50 includes a layer 51 of the sheet material A, a layer 52 of the sheet material B, and an edge portion 53 of the edge material. When the multilayer film 50 is observed, the surface layer at the central portion in the width direction is thinned by the flow of the portion near the surface layer of the laminate from the central portion to both end portions in the width direction due to effects produced by widening the die in the width direction as described as the problem of the conventional laminated sheet producing apparatus. Thus, a laminated sheet in which the thickness of each layer becomes non-uniform in the width direction and the lamination precision is low may be produced. A multilayer film showing the thickness change of the layer in the width direction becomes a defective product in which the reflectance of light with a target wavelength is reduced or light other than the target light is also reflected by the thickness change.

Figure 9:
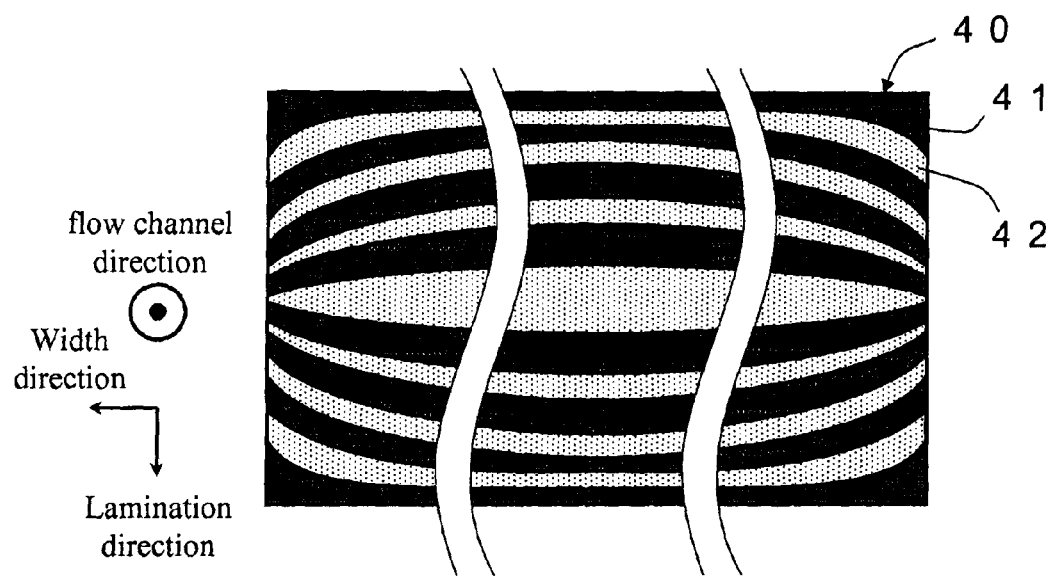
FIG. 9 is a cross-sectional view of a multilayer film produced using the conventional laminated sheet producing apparatus.
Figure 11:
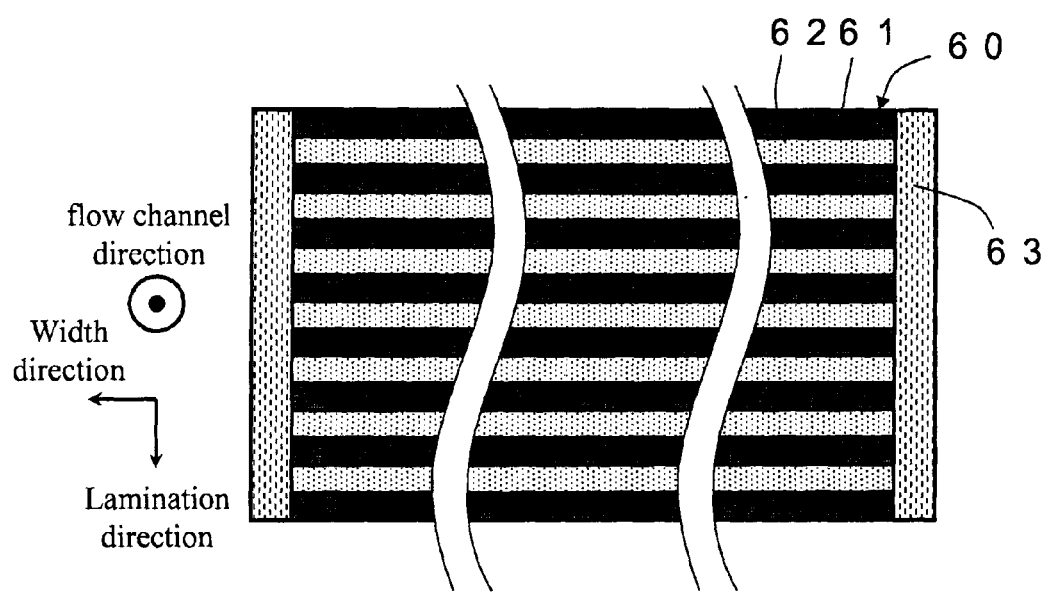
FIG. 11 is a cross-sectional view of a multilayer film produced using the laminated sheet producing apparatus in an embodiment.

On the other hand, a multilayer film with high lamination precision can be produced from a laminated sheet which is formed using the laminated sheet producing apparatus in the embodiment, namely, the laminated sheet producing apparatus which simultaneously satisfies the relationships of Formulae (1) and (2). FIG. 11 is a cross-sectional view of a multilayer film produced using the laminated sheet producing apparatus in one embodiment. As shown in FIG. 11, a multilayer film 60 includes a layer 61 of the sheet material A, a layer 62 of the sheet material B, and an edge portion 63 of the edge material. When the multilayer film 60 is observed, the layers 61 and 62 have a uniform thickness in the width direction and have the lamination precision much higher than the multilayer film produced using the conventional laminated sheet producing apparatus of FIG. 9. The reason why the lamination precision becomes very high is as follows. That is, first, the edge material is previously made to flow in both end portions in the width direction at the confluence portion so that the amount of the edge material at both end portions in the lamination direction is larger than that at the central portion in the lamination direction. The thickness of the layer at both end portions in the lamination direction of a portion which is the first laminate in the second laminate (hereinafter referred to as multilayer portion) is made to be thicker than the thickness at the central portion of the lamination direction. Thereafter, the cross-sectional configuration of the flow channel as for the second laminate passed through the conduit is rapidly changed by the die. The fluid near the surface layer of the second laminate flows toward both end portions in the width direction. However, the thickness of the layer at both end portions in the lamination direction near the surface layer of the multilayer portion is previously made to be thicker than the thickness at the central portion of the lamination direction, and therefore the portion previously thickened and the portion flowing out to both end portions are offset even if the fluid near the surface layer of the second laminate flows into both end portions in the width direction. As a result, the thickness in the width direction of the laminated sheet discharged from the die is uniform as shown in FIG. 11.

In this regard, an example in which the cross-sectional configuration of each flow channel of the edge material is larger at the end portion side in the width direction at both end portions in the lamination direction is shown in FIG. 6. The cross-sectional configuration may be larger at the central portion side in the width direction. The same effect may be obtained.

Further, the present inventors have found out that a range that satisfies the relation of Formula (3) is preferable in the cross-sectional configuration. The use of the range allows the thickness in the lamination direction of the laminated sheet discharged from the die to be more uniform.

$$Sn/S1 \leq 1.0+0.25(n-1) \quad (3)$$

Figure 8:
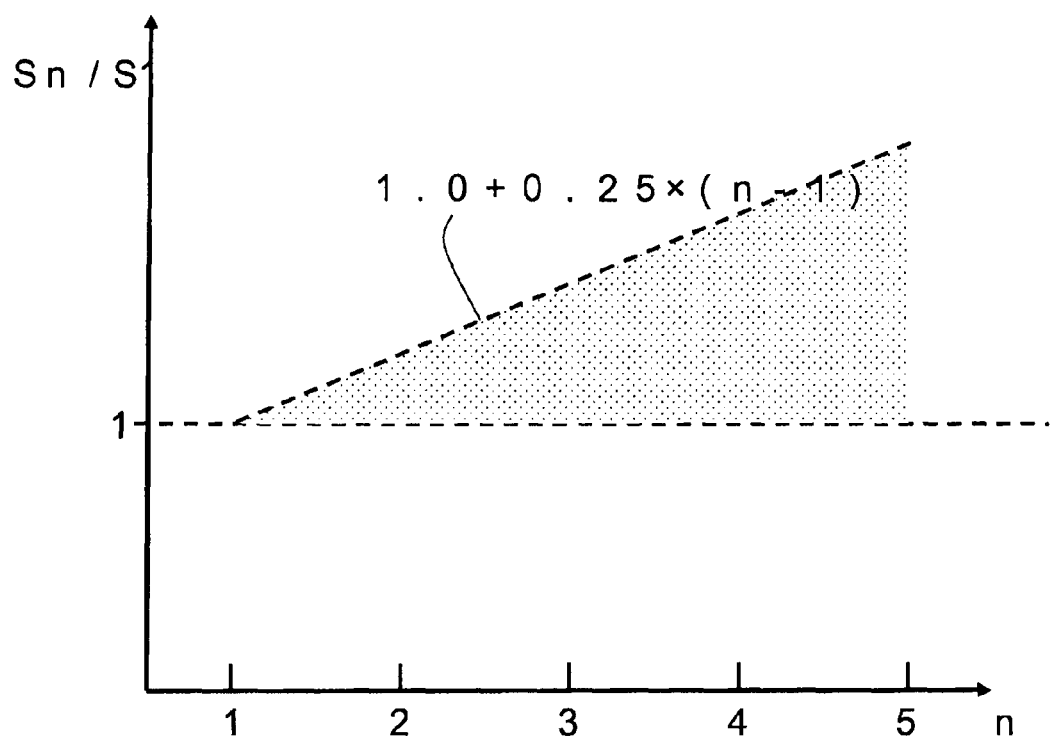
FIG. 8 is a graph of the area of each region obtained by dividing a cross-sectional configuration perpendicular to the flow channel direction of each flow channel of the edge material which is used in the laminated sheet producing apparatus in an embodiment.

Here, the range will be described using a graph. FIG. 8 is a graph of the area of FIG. 7, namely, a graph of the area of each region obtained by dividing the cross-sectional configuration perpendicular to the flow channel direction of each flow channel of the edge material which is used in the laminated sheet producing apparatus in the embodiment. As shown in FIG. 8, a vertical axis represents $Sn/S1$ (n=1, 2, 3, 4, 5), a horizontal axis represents n, and dashed lines represent Formulae (4) and (5), respectively. The shaded portion in FIG. 8 indicates the range of Formulae (1), (2), and (3).

$$Sn/S1=1 \quad (4)$$

$$Sn/S1 \leq 1.0+0.25(n-1) \quad (5)$$

Subsequently, examples of the cross-sectional configuration perpendicular to the flow channel direction of each flow channel of the edge material which may be formed so as to be included in the range will be described.

Figure 12:
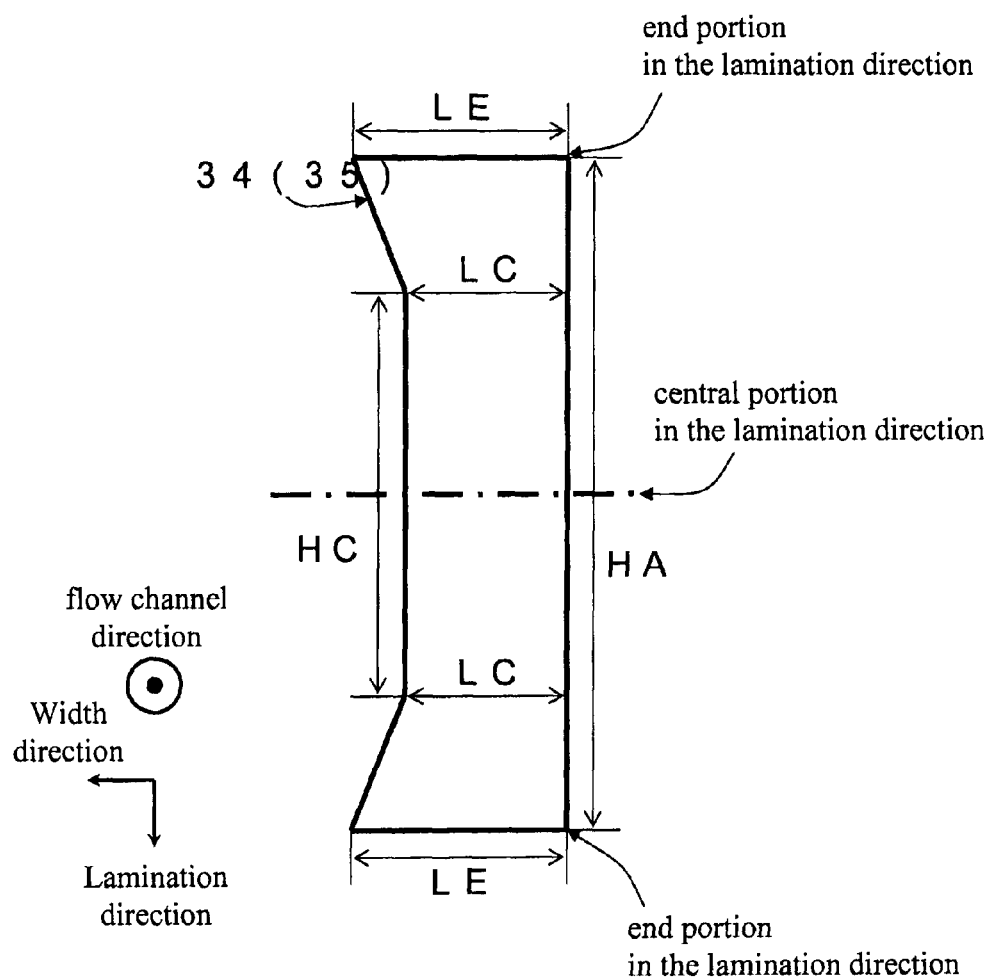
FIG. 12 is a schematic view of a cross-sectional configuration perpendicular to the flow channel direction of each flow channel of the edge material which is used in the laminated sheet producing apparatus in an embodiment.

As with Examples as described hereinbelow, FIG. 12 is a schematic view of a cross-sectional configuration perpendicular to the flow channel direction of each flow channel of the edge material which is used in the laminated sheet producing apparatus in the embodiment. The cross-sectional configuration is symmetrical to the lamination direction around the central portion in the lamination direction. A size LE in the width direction at both end portions in the lamination direction is equal and a size LC in the width direction at the central portion in the lamination direction is smaller than the size LE. The size in the width direction within the range of a size HC in the lamination direction around the central portion in the lamination direction is equal to the size LC. All of them are formed by a straight line. Further, HA represents the size in the lamination direction of the whole cross-sectional configuration.

Figure 13:
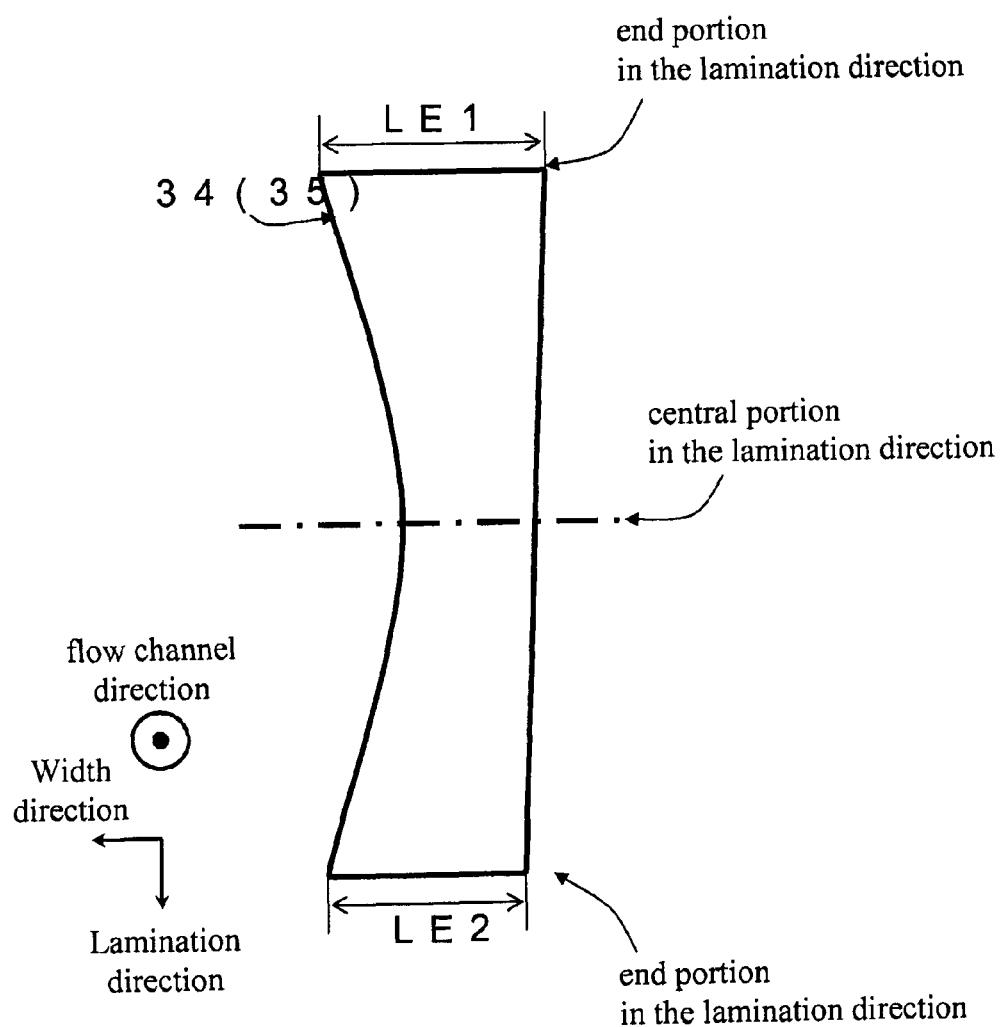
FIG. 13 is a schematic view of a cross-sectional configuration perpendicular to the flow channel direction of each flow channel of the edge material which is used in the laminated sheet producing apparatus in an embodiment.

FIG. 13 is a schematic view of a cross-sectional configuration perpendicular to the flow channel direction of each flow channel of the edge material which is used in the laminated sheet producing apparatus in the embodiment which is different from FIG. 12. The cross-sectional configuration is not symmetrical to the lamination direction around the central portion in the lamination direction. Sizes LE1 and LE2 in the width direction at both end portions in the lamination direction are not equal and they are formed including a curve.

Figure 14:
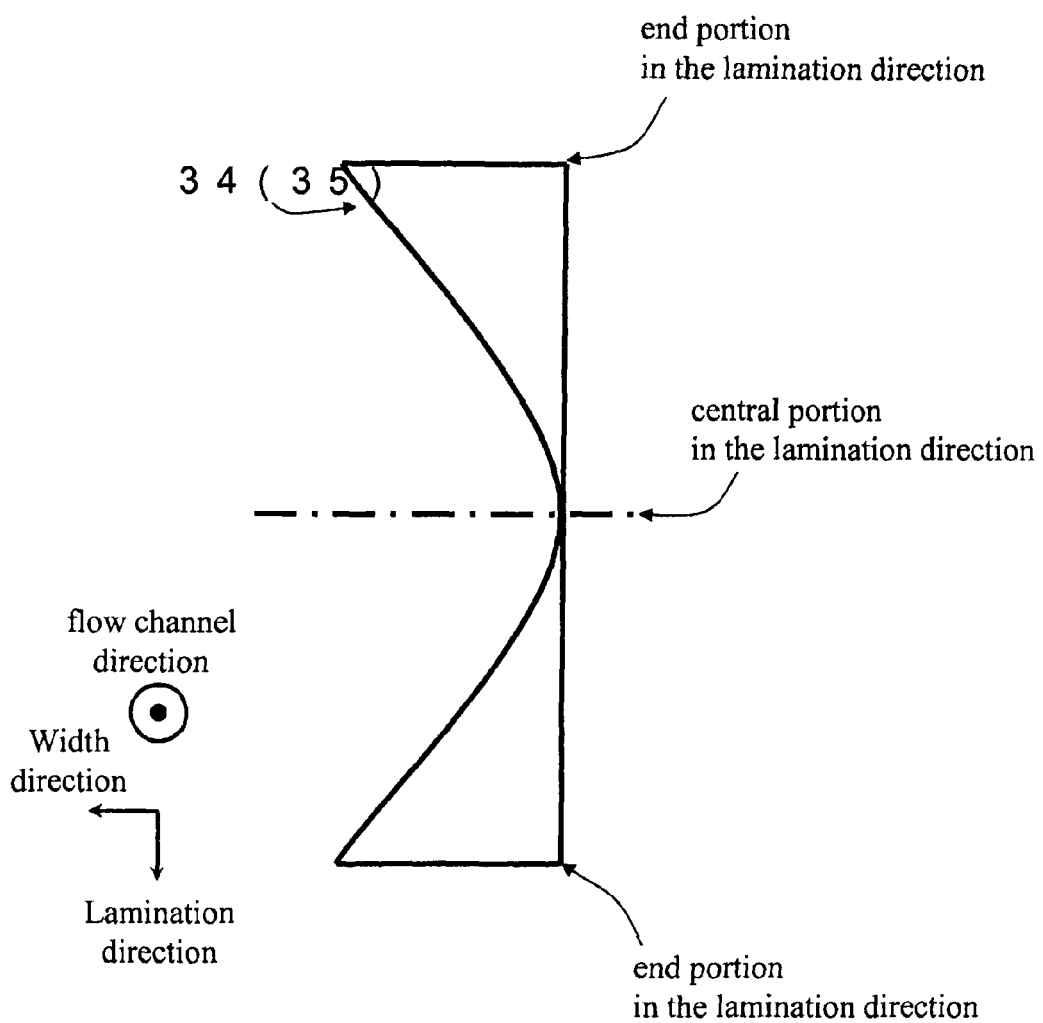
FIG. 14 is a schematic view of a cross-sectional configuration perpendicular to the flow channel direction of each flow channel of the edge material which is used in the laminated sheet producing apparatus in an embodiment.

FIG. 14 is a schematic view of a cross-sectional configuration perpendicular to the flow channel direction of each flow channel of the edge material which is used in the laminated sheet producing apparatus in the embodiment which is different from FIGS. 12 and 13. The cross-sectional configuration is formed including a curve and the size in the width direction at the central portion in the lamination direction is almost zero.

Here, it may be necessary to mold the cross-sectional configuration perpendicular to the flow channel direction of each flow channel of the edge material into an appropriate shape with the die to be used or under the film production conditions.

Figure 20:
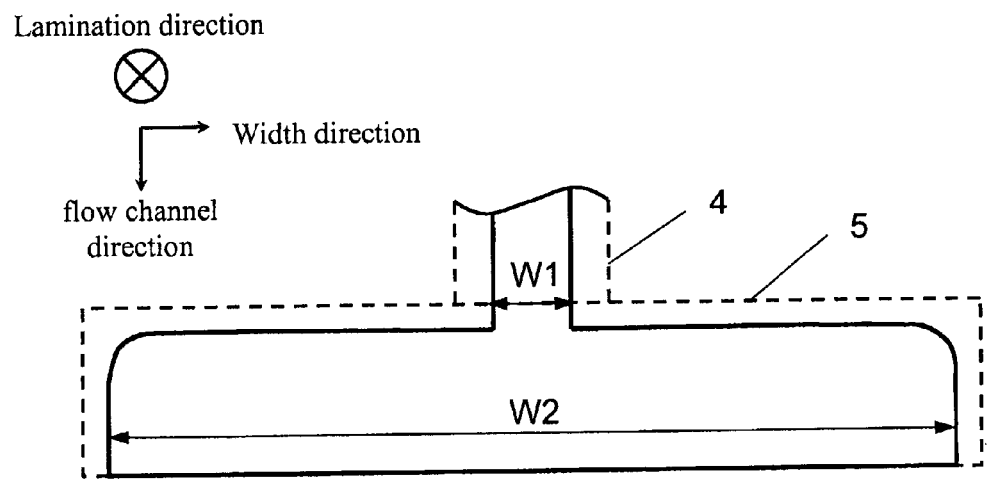
FIG. 20 is a cross-sectional view perpendicular to the lamination direction of the die which is used in the laminated sheet producing apparatus in the embodiment.

Further, the die to be used in the laminated sheet producing apparatus in the embodiment is preferably in the range of $5<W2/W1<50$. FIG. 20 is a cross-sectional view perpendicular to the lamination direction of the die which is used in the laminated sheet producing apparatus in one embodiment. When the value of W2/W1 is less than 5, effects produced by the wall surface or widening of the die are small. Therefore, the thickness change of each layer also becomes smaller and the need for lamination of the edge material is reduced. When the value of W2/W1 is 50 or more, effects produced by the wall surface or widening of the die are large. Therefore, the thickness change of each layer also becomes larger and it is difficult to sufficiently increase the lamination precision only by laminating the surface layer portion. More preferably, it is $10<W2/W1<30$.

The laminated sheet producing apparatus according to an embodiment can provide a multilayer film having a film thickness in the range of 1 to 600 μm, a layer number in the range of 50 to 3000, and a lamination precision of 0.002 or less. In a more preferred embodiment, the lamination precision is 0.001 or less.

The laminated sheet producing apparatus of the embodiment can provide a multilayer film having a film thickness in the range of 1 to 600 μm, a layer number in the range of 50 to 3000, and a lamination unevenness of 0.20 or less. In a more preferred embodiment, the lamination unevenness is 0.15 or less.

EXAMPLES

Example 1

Figure 3:
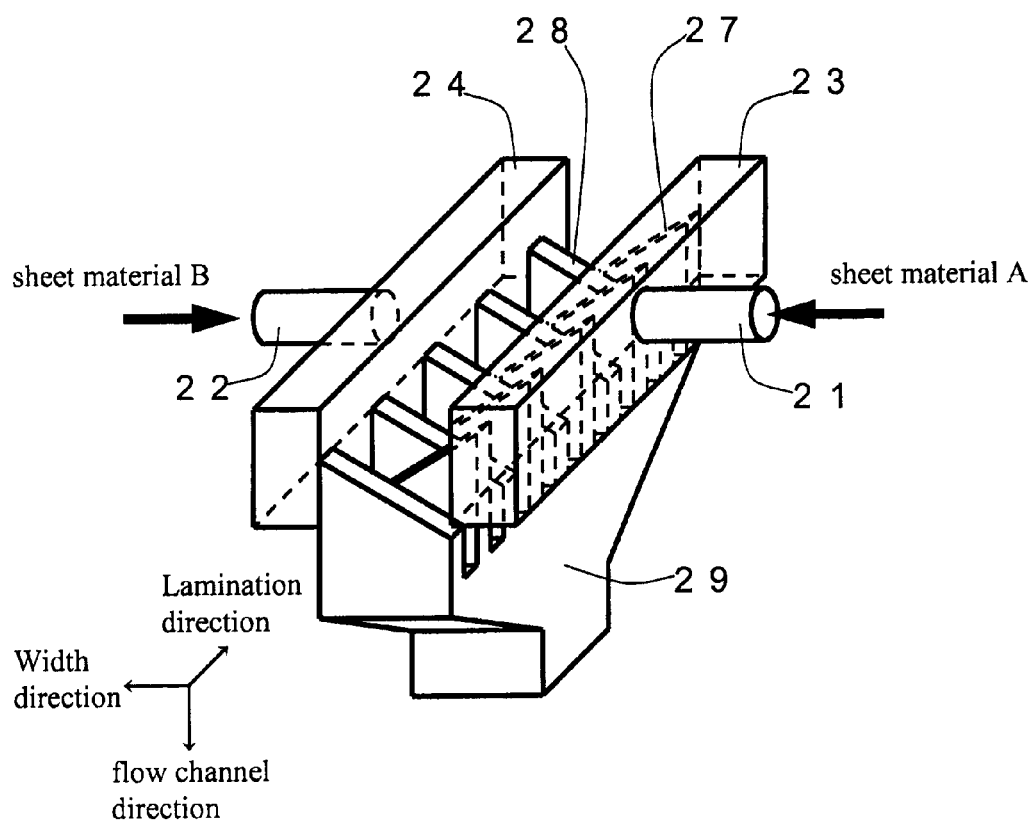

The embodiments described herein, namely, in which a multilayer film was actually produced using the laminated sheet producing apparatus shown, for example, in FIG. 4 and the multilayer laminating apparatus 3 shown in FIG. 3 and lamination precision was evaluated will be described. A specific method for producing a multilayer film according to an embodiment is as follows:
(1) Sheet materials: sheet material A; polyethylene terephthalate (PET) resin (thermoplastic resin F20S, manufactured by Toray Industries, Inc.), sheet material B; cyclohexane dimethanol copolymer PET (thermoplastic resin PETG6763, manufactured by Eastman Kodak Co., Ltd.), edge material; polyethylene terephthalate (PET) resin (thermoplastic resin F20S, manufactured by Toray Industries, Inc.)
(2) Preparation: each sheet material and the edge material were dried and supplied to an extruder. The extruder was set at 280° C. Each sheet material was supplied to the multilayer laminating apparatus after passing through a gear pump and a filter and laminated. Further, the edge material was supplied to the edge adding apparatus to allow it to be added.
(3) Multilayer laminating apparatus: slit gaps corresponding to each layer were set to as follows: 0.75 mm for a layer A, 0.6 mm for a layer B (both processing precision: 0.01 mm), slit width; 26 mm, the slit length; 18 mm. The above-described resins were discharged from a slit including 101 layers (layer A) and 100 layers (layer B). The target lamination ratio was A:B=2:1 and both surface layer portions were the layer A. In this regard, the flow channel cross-sectional configuration of the lamination completing unit 29 is rectangular.
(4) Cross-sectional configuration perpendicular to flow channel direction of each flow channel of the edge material: the edge adding apparatus was processed so as to form the cross-sectional configuration shown in FIG. 12. Each size is shown in Table 1. In this regard, the cross-sectional configuration of the flow channel 31 is rectangular having a size in the width direction of 76 mm and a size in the lamination direction of 32 mm.
(5) Discharge: after the completion of addition of the edge portion by the edge adding apparatus, a laminate passed through the conduit was supplied to a T die and extruded into a sheet shape. Then, the laminate was quench solidified on the casting drum whose surface temperature was maintained at 25° C. by electrostatic application (direct voltage, 8 kV) and molded.
(6) Surface treatment: a formed unstretched film was conveyed by a roll. In a coating apparatus, both surfaces of the unstretched film were subjected to corona discharge treatment in air. The wet tension was 55 mN/m. A membrane for forming a laminated layer including polyester resin with a glass transition temperature Tg of 18° C./polyester resin with a Tg of 82° C./silica particles with an average particle diameter of 100 nm was applied to the treated surface and a transparent, easy-sliding, and easy-adhesive layer was formed.
(7) Heat treatment: then, the film was successively guided to a biaxial stretching machine, followed by preheating with hot air at 95° C. Thereafter, it was drawn 3.5 times in the vertical direction (longitudinal direction of the film) and the horizontal direction (width direction of the film), respectively. Further, the resulting film was subjected to heat treatment with hot air at 230° C. and 5% relaxation treatment in the vertical direction and at the same time, 5% relaxation treatment in the horizontal direction, and then gradually cooled to room temperature, followed by rolling up.

Figure 15:
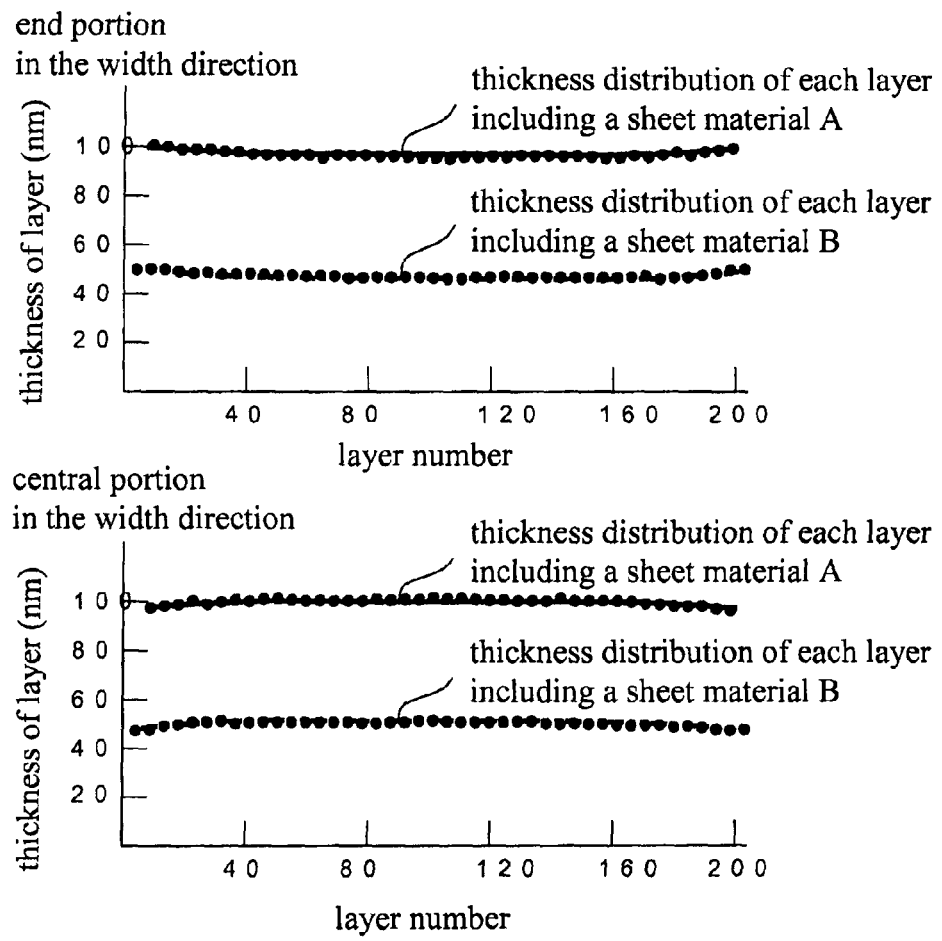
FIG. 15 is a graph showing the measured thickness distribution of each layer including a sheet material A and each layer including a sheet material B at the end portion or the central portion in the width direction of the multilayer film in Example 1.

The results are shown in Table 1. Further, FIG. 15 is a graph showing the measured thickness distribution of each layer including the sheet material A and each layer including the sheet material B at the end portion or the central portion in the width direction of the multilayer film in Example 1. As shown in FIG. 15, the horizontal axis indicates the layer number and the vertical axis indicates the thickness of layers. The sheet material A and the sheet material B are separately shown. As shown in FIG. 15, it is found that the thickness of each layer in the multilayer film is uniform in the width direction.

Example 2

A multilayer film was produced in the same manner as described in Example 1 except that each size of FIG. 12 was changed as shown in Table 1. The results are shown in Table 1.

Example 3

A multilayer film was produced in the same manner as described in Example 1 except that each size of FIG. 12 was changed as shown in Table 1. The results are shown in Table 1. The cross-sectional configuration satisfies the condition according to claim 3.

Example 4

A multilayer film was produced in the same manner as described in Example 1 except that each size of FIG. 12 was changed as shown in Table 1. The results are shown in Table 1. The cross-sectional configuration satisfies the condition according to claim 3.

Comparative Example 1

Figure 16:
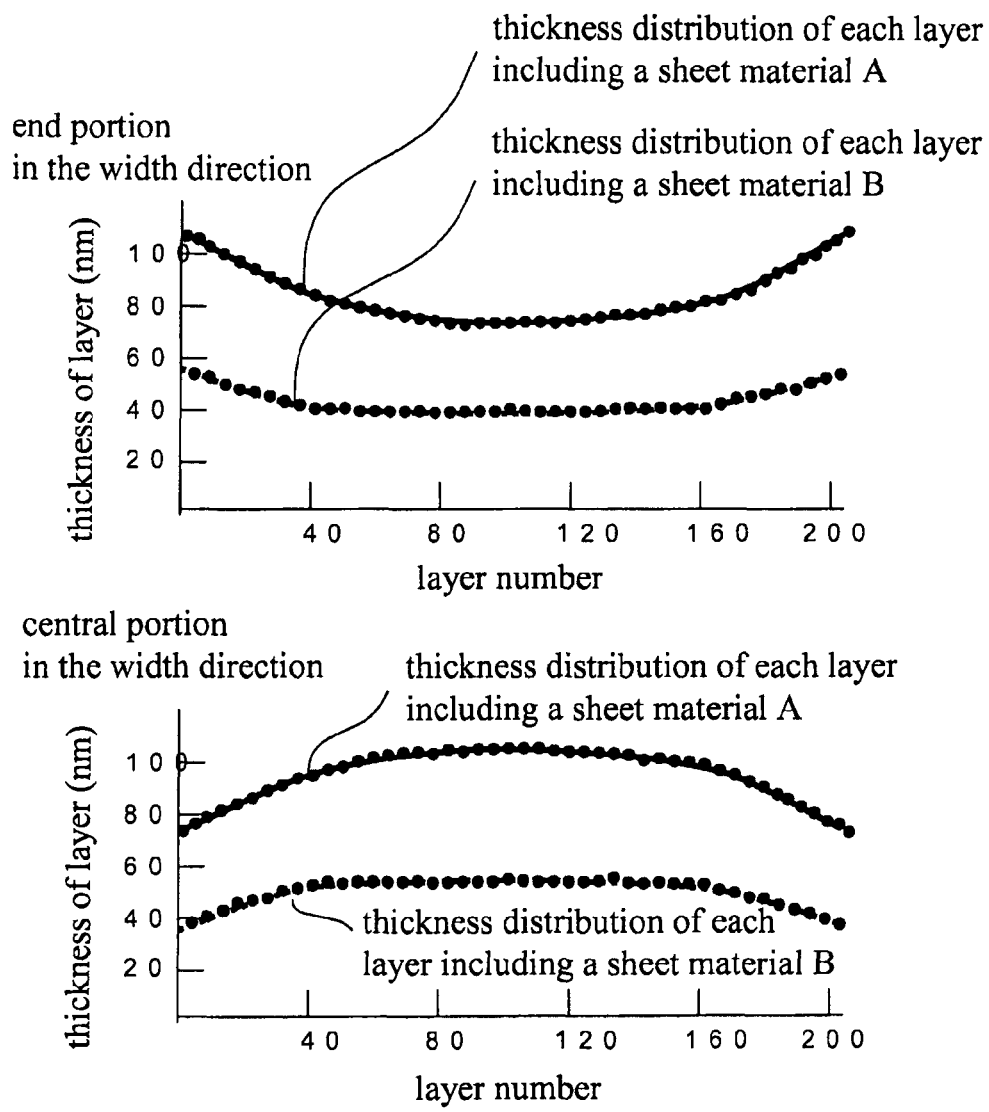
FIG. 16 is a graph showing a measured thickness distribution of each layer including a sheet material A and each layer including a sheet material B at the end portion or the central portion in the width direction of the multilayer film in Comparative Example 1.

A multilayer film was produced in the same manner as described in Example 1 except that each size of FIG. 12 was changed as shown in Table 1. The cross-sectional configuration is rectangular. The results are shown in Table 1. FIG. 16 is a graph showing the measured thickness distribution of each layer including the sheet material A and each layer including the sheet material B at the end portion or the central portion in the width direction of the multilayer film in Comparative Example 1. As shown in FIG. 16, the horizontal axis indicates the layer number and the vertical axis indicates the thickness of layers. The sheet material A and the sheet material B are separately shown. As shown in FIG. 16, it is found that the thickness of the layer closer to the surface layer is thinner in each layer of the multilayer film at the central portion in the width direction and the thickness of the layer closer to the surface layer is thicker at both end portions in the width direction. Further, the multilayer film has a layer structure as shown in FIG. 10.

Comparative Example 2

A multilayer film was produced in the same manner as described in Example 1 except that each size of FIG. 12 was changed as shown in Table 1. As for the cross-sectional configuration of the flow channel, the size in the width direction at both end portions in the lamination direction is smaller than the size in the width direction at the central portion of the lamination direction. The results are shown in Table 1.

TABLE 1

|  | Example 1 | Example 2 | Example 3 | Example 4 | Comparative Example 1 | Comparative Example 2 |
|---|---|---|---|---|---|---|
| LC(mm) | 1.0 | 2.0 | 2.0 | 2.0 | 2.0 | 2.0 |
| LE(mm) | 3.5 | 4.8 | 3.0 | 3.8 | 2.0 | 1.6 |
| HA(mm) | 35.0 | 35.0 | 35.0 | 35.0 | 35.0 | 35.0 |
| HC(mm) | 28.0 | 21.0 | 21.0 | 14.0 | 35.0 | 21.0 |
| S2/S1 | 1.000 | 1.000 | 1.000 | 1.000 | 1.000 | 1.000 |
| S3/S1 | 1.000 | 1.000 | 1.000 | 1.150 | 1.000 | 1.000 |
| S4/S1 | 1.000 | 1.350 | 1.125 | 1.450 | 1.000 | 0.950 |
| S5/S1 | 2.250 | 2.050 | 1.375 | 1.750 | 1.000 | 0.850 |
| W1(mm) | 76 | 76 | 76 | 76 | 76 | 76 |
| W2(mm) | 700 | 700 | 700 | 700 | 700 | 700 |
| W2/W1 | 9.21 | 9.21 | 9.21 | 9.21 | 9.21 | 9.21 |
| thickness of a multilayer film (μm) | 100 | 100 | 100 | 100 | 100 | 100 |
| lamination precision | 0.0015 | 0.0013 | 0.0009 | 0.0008 | 0.0023 | 0.0036 |
| lamination unevenness | 0.20 | 0.18 | 0.12 | 0.11 | 0.31 | 0.48 |

Figure 17:
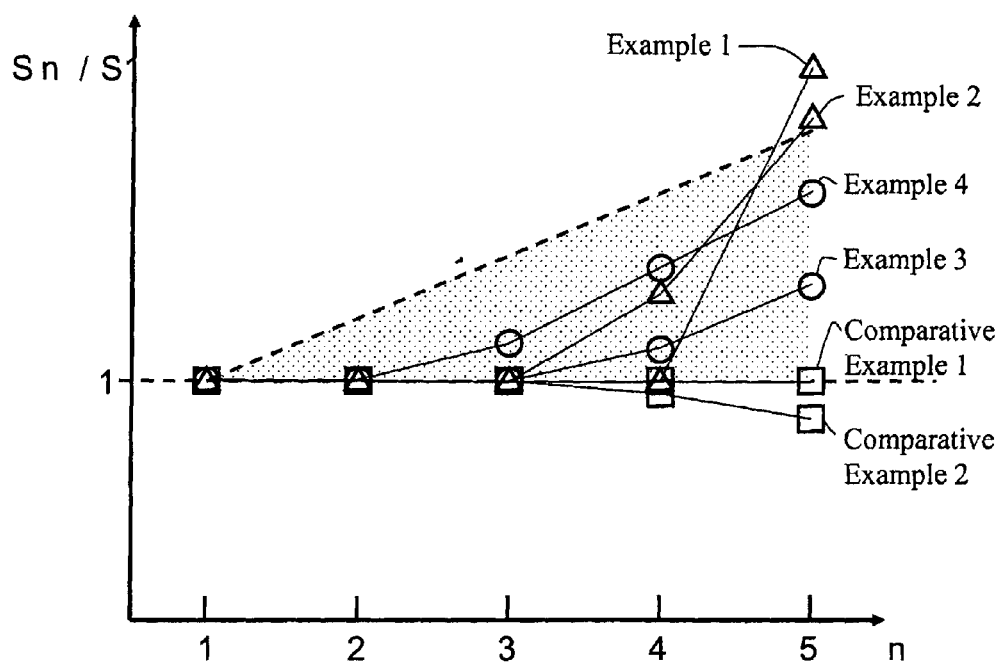
FIG. 17 is a graph of FIG. 8 in which values of Sn/S1 in Examples and Comparative Examples are plotted.
Figure 18:
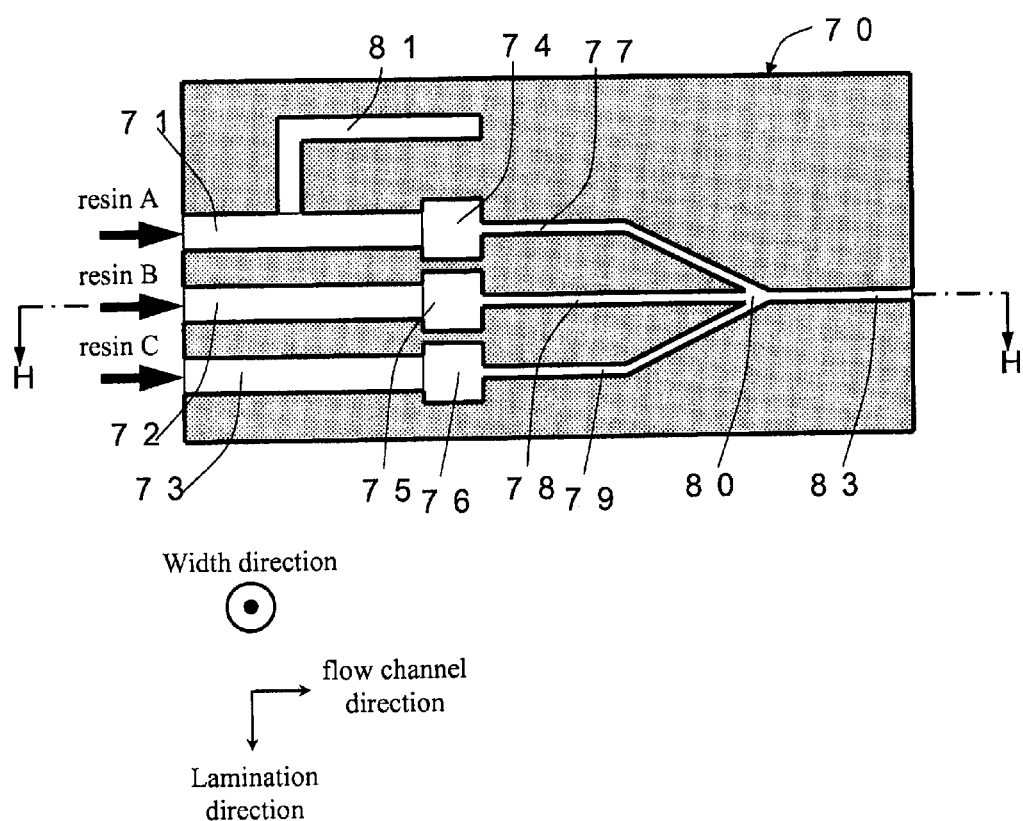
FIG. 18 is a cross-sectional view perpendicular to the width direction of the multi-manifold die of Patent document 2.
Figure 19:
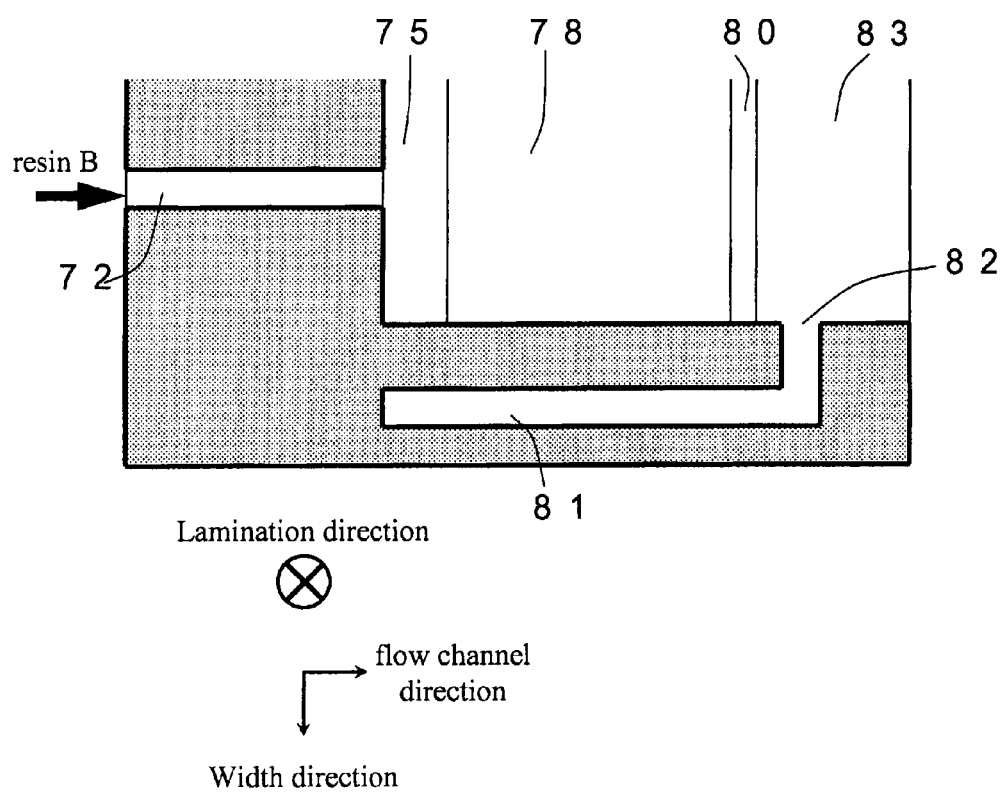
FIG. 19 is a cross-sectional view perpendicular to the lamination direction of the multi-manifold die of Patent document 2.

FIG. 17 is a graph of FIG. 8 in which values of Sn/S1 in Examples and Comparative Examples are plotted. Triangular marks represent Examples 1 and 2, circular marks represent Examples 3 and 4, and square marks represent Comparative Examples 1 and 2 in FIG. 17. Further, the shaded portion indicates the range of Formulae (1), (2), and (3). As the results of Examples, from Table 1 and FIG. 17, in Examples 1, 2, 3, and 4, namely, when as for the cross-sectional configuration perpendicular to the flow channel direction of each flow channel of the edge material, the size in the width direction at the central portion in the lamination direction is smaller than the size in the width direction at both end portions in the lamination direction, a multilayer film with high lamination precision is formed. In addition, in Examples 3 and 4, when the cross-sectional configuration perpendicular to the flow channel direction of each flow channel of the edge material satisfies the relation of Formula (3), a multilayer film with higher lamination precision is formed.

A laminated sheet produced by an embodiment of the present invention is formed by the steps of laminating a plurality of kinds of sheet materials in the lamination direction as layers having a layer number more than the number of the plurality of kinds of sheet materials, adding an edge material to at least one of the end portions in the width direction thereof as an edge portion, and solidifying the resultant. According to an embodiment of the present invention, a laminated sheet in which the thickness of each layer is uniform in the width direction and which is laminated with high precision may be easily produced.

The invention claimed is:

1. A laminated sheet producing apparatus comprising:
    a multilayer laminating apparatus that forms a first laminate in which a plurality of kinds of sheet materials are laminated in a lamination direction as layers having a layer number more than the number of the plurality of kinds of sheet materials;
    an edge adding apparatus having a confluence portion which forms a second laminate in which an edge material is added to at least one end portion in a width direction of the first laminate flowing along a flow channel direction as an edge portion; and
    a die that molds the second laminate into a sheet shape widening the second laminate in the width direction;
    wherein an area of each region resulting from division of a cross-sectional configuration of each flow channel for the edge material perpendicular to the flow channel direction at the confluence portion by lines for dividing the configuration into 10 equal portions in the lamination direction is defined as Sn (n=1, 2, 3, 4, 5) in the direction from a central portion in the lamination direction toward an end portion in the lamination direction, the relationships of Formula (1) where S1≤S2≤S3≤S4≤S5 and Formula (2) where S1<S5 are simultaneously satisfied.

2. The laminated sheet producing apparatus according to claim 1, wherein the relationship of Formula (3) where Sn/S1≤1.0+0.25(n−1) is satisfied in the cross-sectional configuration.

3. The laminated sheet producing apparatus according to claim 2, wherein the width direction of an inflow portion is defined as W1 and the width direction of an outflow portion is defined as W2 in the flow channel in the die, and the range is 5<W2/W1<50.

4. The laminated sheet producing apparatus according to claim 1, wherein the width direction of an inflow portion is defined as W1 and the width direction of an outflow portion is defined as W2 in the flow channel in the die, and the range is 5<W2/W1<50.

* * * * *